March 16, 1926.

D. DONNELLY

STEEL SPRING CUSHION TIRE DEVICE

Filed Oct. 1, 1924

1,577,013

Witness
Kat Rusher

Inventor
Dennis Donnelly
by Bair & Freeman Attorneys

Patented Mar. 16, 1926.

1,577,013

UNITED STATES PATENT OFFICE.

DENNIS DONNELLY, OF GILMORE CITY, IOWA, ASSIGNOR OF ONE-FOURTH TO JOHN S. McBRIDE AND ONE-FOURTH TO EDWARD A. LAW, BOTH OF FORT DODGE, IOWA.

STEEL-SPRING CUSHION-TIRE DEVICE.

Application filed October 1, 1924. Serial No. 741,042.

*To all whom it may concern:*

Be it known that I, DENNIS DONNELLY, a citizen of the United States, residing at Gilmore City, in the county of Pocahontas and State of Iowa, have invented a certain new and useful Steel-Spring Cushion-Tire Device, of which the following is a specification.

The object of my invention is to provide a steel spring cushion tire of simple, durable and comparatively inexpensive construction.

More particularly, my invention relates to a wheel for supporting a load, which wheel is formed with a floating central member or inner rim and an outer member, which is positioned to slide within said inner member with leaf springs arranged therebetween.

Still a further object is to provide an inner and outer rim slidably mounted, one within the other and so ararnged that a channel shaped chamber is formed between the rims, in which channel shaped chamber are a number of leaf springs, which permit movement of the rims relative to each other and at the same time serve as a cushioning means for the wheel itself.

Still a further object is to arrange the springs in such position as will prevent their becoming filled with dust or dirt and to provide for the oiling or greasing thereof wherein the parts may freely operate for giving me a spring wheel of maximum efficiency.

With these and other objects in view, my invention consists in the construction, arrangement and combination of the various parts of my device, whereby the objects contemplated are attained as hereinafter more fully set forth, pointed out in my claims, and illustrated in the accompanying drawings, in which:

Figure 1:
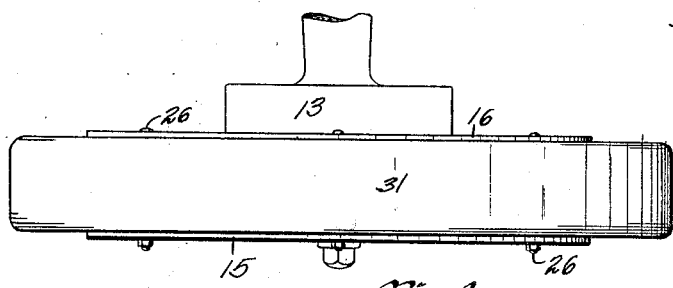
Figure 1 is a top, plan view of a wheel embodying my invention.
Figure 3:
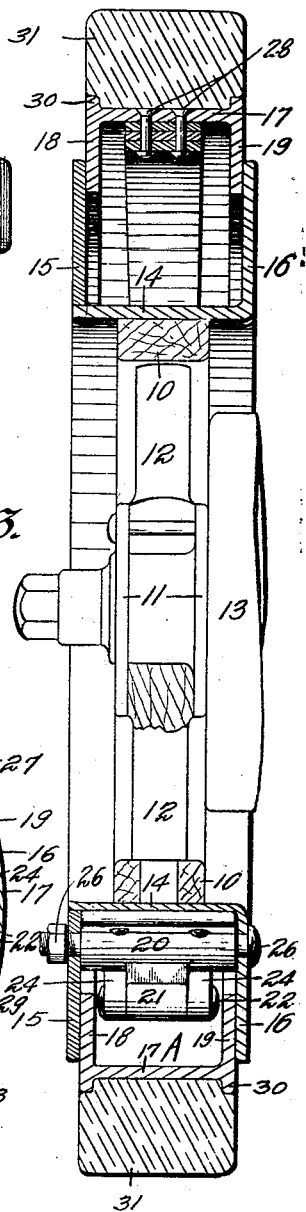
Figure 3 is a central, vertical, sectional view taken on line 3—3 of Figure 2.

In the embodiment of my invention as shown in the accompanying drawings, I have used the reference numeral 10 to indicate an ordinary wooden or steel felly of the wheel 11, which includes the ordinary spokes 12.

The wheel 11 may have fixed to it a brake drum 13 of the ordinary construction.

My improved steel spring cushion tire includes an inner rim 14, which is L shaped in cross section.

A removable wall or flange 15 cooperates with the inner rim 14, which flange corresponds to the outturned flange 16 of the rim 14.

The flanges 15 and 16 are identical so far as shape is concerned except that the flange 15 is removable for a purpose hereafter to be more fully explained.

The rim 14 is secured to the felly 10 of the wheel 11 in the ordinary manner.

An outer rim 17 is formed with a pair of inwardly extending flanges 18 and 19, which are positioned against the inner surfaces of the flanges or walls 15 and 16 respectively.

The rim 17, with its flanges 18 and 19 is positioned within the flanges 15 and 16 of the rim 14 and is capable of sliding movement relative thereto.

Secured to the rim 14 on its outer surface are a number of bearings 20, which are equally spaced apart and which may be riveted or otherwise fastened to the rim 14 itself.

The bearings 20 are formd with outwardly extending extensions 21 which are formed with a pair of openings 22, in which are received rivets or bolts 23.

Links 24 are fastened to the rivets 23 on each side of the extensions 21 of the bearings 20.

The bearings 20 are also formed with openings 25, which receive locking bolts 26.

The locking bolts 26 extend through the flange 16 of the rim 14 and also through the flange 15, which is demountable relative to the rim 14.

The flange 15 rests against the bearing members 20 and is held together therewith by the bolts 26.

When it is desired to remove the flange 15 for gaining access to the bearing members 20, all that is necessary is to remove the nuts from the bolts 26.

Fixed to the inner surface of the outer rim 17 are a number of leaf springs 27, which are fixed at a point midway between the ends to the rim 17 by rivets or the like 28.

The springs 27 are connected at their outer ends to the links 24 by means of a pivotal connection 29.

Figure 2:
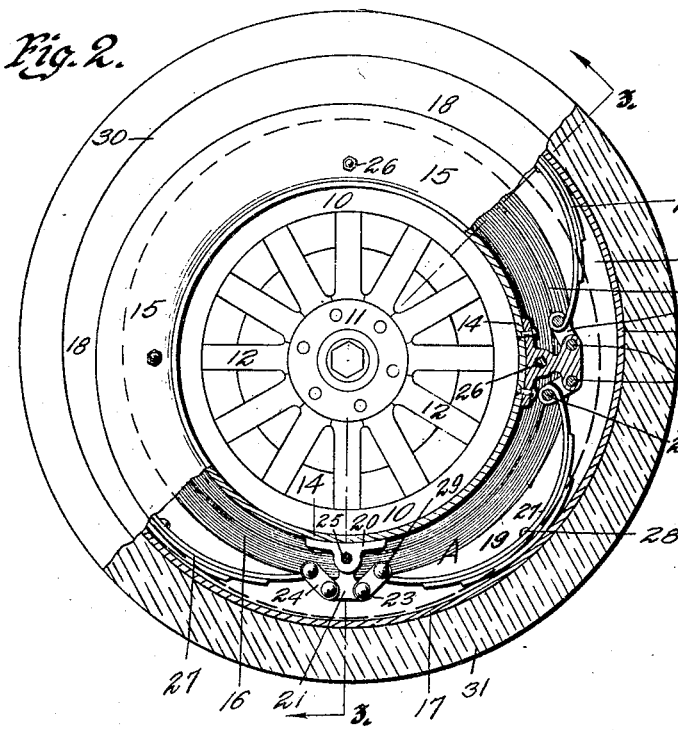
Figure 2 is a front elevational view of the same, parts being broken away and shown in section to better illustrate the construction thereof, and the inner rim being shown in position it will assume when supporting a load.

The bearing members 20 are so positioned that they will be spaced adjacent two opposite ends of two adjacent springs 27, as clearly shown in Figure 2 of the drawings.

The rim 17 is provided with a pair of beads or ribs 30, which receive therebetween a resilient band or tread 31.

From the construction of the parts just described, it will be seen that when weight is applied upon the wheel 11, it will cause the springs positioned on the lower half of the rim 17 to be compressed while the springs on the upper half will be expanded. If the wheel continues to rotate upon the tread 31, the contraction and expansion of the springs will take place.

The rim 17 as well as the tread 31 are connected to the rim 14 through the springs 27, and the flanges 15 and 16 on the rim 14 prevent any sideward movement of the rim 17.

The flanges 15 and 16 and 18 and 19 are so arranged that the limit of movement of one rim relative to the other will not space the flanges 15 and 16 from the flanges 18 and 19 sufficiently to get them in position where they will not slide and be received within the other flanges.

The flanges 15 and 16 and the flanges 18 and 19 form a compartment or chamber A, in which may be placed lubricating grease for properly keeping the parts lubricated for permitting them to operate freely.

The arrangement of the leaf springs together with the rubber tread 31 will form a cushioning effect for the load carried by the wheels giving practically the same result as though the tire was a pneumatic one.

Some changes may be made in the construction and arrangement of the various parts of my invention, without departing from the real spirit and purpose of my invention, and it is my intention to cover by my claims, any modified forms of structure or use of mechanical equivalents, which may be reasonably included within their scope.

I claim as my invention:

1. A steel spring cushion tire device comprising inner and outer rims channel shaped in cross section, slidably mounted one within the other so that an annular chamber is formed, flat leaf springs interposed between said inner and outer rims and received in the chamber, said springs being rigidly fixed to one of said rims, bearings secured to the other of said rims, said springs being pivoted by means of links to said bearings, and the plate, forming one side of said other of said rims being detachably secured to said bearings.

2. A steel spring cushion tire device comprising inner and outer rims channel shaped in cross section slidably mounted one within the other so that an annular chamber is formed, flat leaf springs interposed between said inner and outer rims and received in the chamber, said springs being fixed at their centers to one of said rims, bearings fixed to said other rim and spaced apart so that the ends of two adjacent leaf springs are in close proximity of the bearing therebetween, said springs being pivotally connected to said bearings, one wall of said other rim being detachably secured to said bearings for permitting assembly or disassembly of the parts relative to each other.

3. A steel spring cushion tire device comprising inner and outer rims, channel shaped in cross section, slidably mounted one within the other so that an annular chamber is formed, flat leaf springs interposed between said inner and outer rims and received in the chamber, said springs being fixed at their centers to said outer rim, bearings fixed to said inner rim and spaced apart so that the ends of two adjacent leaf springs are in close proximity of the bearing therebetween, links pivotally connected to the ends of said springs and connected to said bearings whereby the outer rim may move relative to the inner rim so that their centers are different, said springs serving to hold the rims together, one wall of said inner, channel shaped rim being detachably secured to said bearings and a resilient tread on said outer rim as and for the purposes stated.

Des Moines, Iowa, September 17, 1924.

DENNIS DONNELLY.